Jan. 26, 1971 H. K. THOMPSON 3,559,055
AUTOMATIC CONDUCTOR PAIR IDENTIFICATION APPARATUS TO PERMIT IDENTIFICATION OF CROSSED CONDUCTOR PAIRS BY INHIBITING THE RECYCLING OF THE IDENTIFICATION APPARATUS
Filed Dec. 24, 1968 2 Sheets-Sheet 1

CENTRAL OFFICE LOCATION

INVENTOR
H. K. THOMPSON
BY Alfred G. Steinmetz
ATTORNEY

AUTOMATIC CONDUCTOR PAIR IDENTIFICATION APPARATUS TO PERMIT IDENTIFICATION OF CROSSED CONDUCTOR PAIRS BY INHIBITING THE RECYCLING OF THE IDENTIFICATION APPARATUS

Filed Dec. 24, 1968 2 Sheets-Sheet 2

United States Patent Office 3,559,055

Patented Jan. 26, 1971

3,559,055

AUTOMATIC CONDUCTOR PAIR IDENTIFICATION APPARATUS TO PERMIT IDENTIFICATION OF CROSSED CONDUCTOR PAIRS BY INHIBITING THE RECYCLING OF THE IDENTIFICATION APPARATUS

Harold K. Thompson, San Anselmo, Calif., assignor to American Telephone and Telegraph Company, New York, N.Y., a corporation of New York Filed Dec. 24, 1968, Ser. No. 786,647

Int. Cl. G01r *31/02;* H04b *3/46;* H04m *3/22*

U.S. Cl. 324—66 7 Claims

ABSTRACT OF THE DISCLOSURE

An automatic conductor pair identifier utilizes a counter to control the stepping of a signal in sequence to the conductor pairs of a multiconductor cable. Upon the detection of the signal on a conductor pair at the other end of the cable the counter stops. The count at which the counter stops represents the identification of the conductor pair on which the signal was detected. If a crossed conductor pair is detected the counter is controlled to resume counting without being reset in order to determine the higher value identification number associated with the crossed conductor pair.

FIELD OF THE INVENTION

This invention relates to automatic conductor pair identification apparatus to identify conductor pairs in a multiconductor cable and more particularly to an automatic conductor pair identification apparatus with facilities to identify crossed conductor pairs.

BACKGROUND OF THE INVENTION

Automatic conductor pair identification apparatus is used to identify conductor pairs in multiconductor telephone cables which generally interconnect a central office location to a plurality of subscribers at some field location. Many automatic identifiers utilize counters to step a tone signal at one end of the cable through all the conductor pairs in sequence. The tone signal is detected by a probe connected to a conductor pair at the other end of the cable. It is utilized to halt the counter. The count at which the counter halts identifies the conductor pair to which the probe is connected.

One particular automatic identification apparatus disclosed in the C. E. Bohnenblust patent application, Ser. No. 591,286, filed Nov. 1, 1966, and assigned to the assignee of the present application, enables a single operator to identify individual conductor pairs of a multiconductor telephone cable. A 2-kilocycle tone signal generated at a field location is transmitted, via a spare conductor pair, to a central office to drive a counter therein. The counter, in response to the 2-kilocycle tone signal, steps signals progressively to a plurality of output leads. These stepped signal outputs are utilized to gate 20-kilocycle signal bursts to each one of the individual conductor pairs in a sequential fashion.

A probing means is conected by the operator to a conductor pair selected at random at the field location. A 20-kilocycle signal burst detected by the probe means is utilized to turn off the 2-kilocycle signal tone source and, hence, halt the progressive signal stepping of the counter at the central office. Each individual output of the counter is connected to a different and unique resistance. The signal output of the halted counter is applied through the unique resistance, via the spare conductor pair, to the field location. A signal magnitude measuring device at the field location measures the signal amplitude transmitted by the spare conductor pair and thereby uniquely identifies the conductor pair selected at random.

The above-described automatic conductor pair identification apparatus is fast and accurate and needs only one operator at the field location to operate it. However, should two conductor pairs be crossed, that is, the signals in one conductor pair are transmitted to another conductor pair due to some form of electrical coupling, the identification apparatus will not identify the higher numbered conductor pair of the crossed conductor pairs. Additionally, the method of transmitting the count identification to the field location, as a signal magnitude, requires a sensitive precalibration of the identification apparatus which is time consuming. The energy to drive the counter is supplied from the field location. Therefore, a source of energy must be included at the field location adding excess weight to the field apparatus.

It is therefore an object of the invention to identify crossed conductor pairs.

It is another object of the invention to transmit conductor pair identification signals to the field location without the necessity of precalibration of the identification apparatus.

It is yet another object of the invention to control the operation of the automatic identification apparatus from the field location without the necessity of including an energy source at the field location.

SUMMARY OF THE INVENTION

Therefore in accordance with the present invention, an automatic conductor pair identification apparatus identifies crossed conductor pairs by identifying both of the crossed conductor pairs with a single connection to one of the crossed pairs. Upon the recurrence of an identification count indicating the existence of a crossed conductor pair, the operator at the field location activates means to transmit a signal to the central office apparatus to inhibit the resetting of a counter at the central office to its zero state as normally occurs when a conductor pair is identified. The probe at the field location is left connected to the same conductor pair and the counting action of the counter is resumed at the count at which the counter had halted. The counter thus continues counting until the next higher identification number of the crossed pairs is determined.

A feature of the automatic identifier embodying the invention is the audio identification of conductor pairs. The counter when halted after the detection by the probe of a tone signal activates a gating arrangement which extracts audio voiced digits corresponding to the identity of the conductor pair from an audio storage medium. These voiced digits are transmitted to an audio read out device at the field location.

Another feature of the automatic identifier embodying the invention is the application of energizing power by simplex transmission techniques from the central office to the identifier apparatus at the field location including apparatus to monitor the continuity of the conductor pair supplying energizing power to the field location. A break in the conductor pair is detected by a transmission detector which is included in the simplex current path of the conductor. A break in either conductor activates the detector.

DESCRIPTION OF THE DRAWINGS

Many advantages and added features will be apparent upon a reading of the following specification accompanied by drawings describing a detailed embodiment of the invention in which.

DETAILED DESCRIPTION

Figure 1:
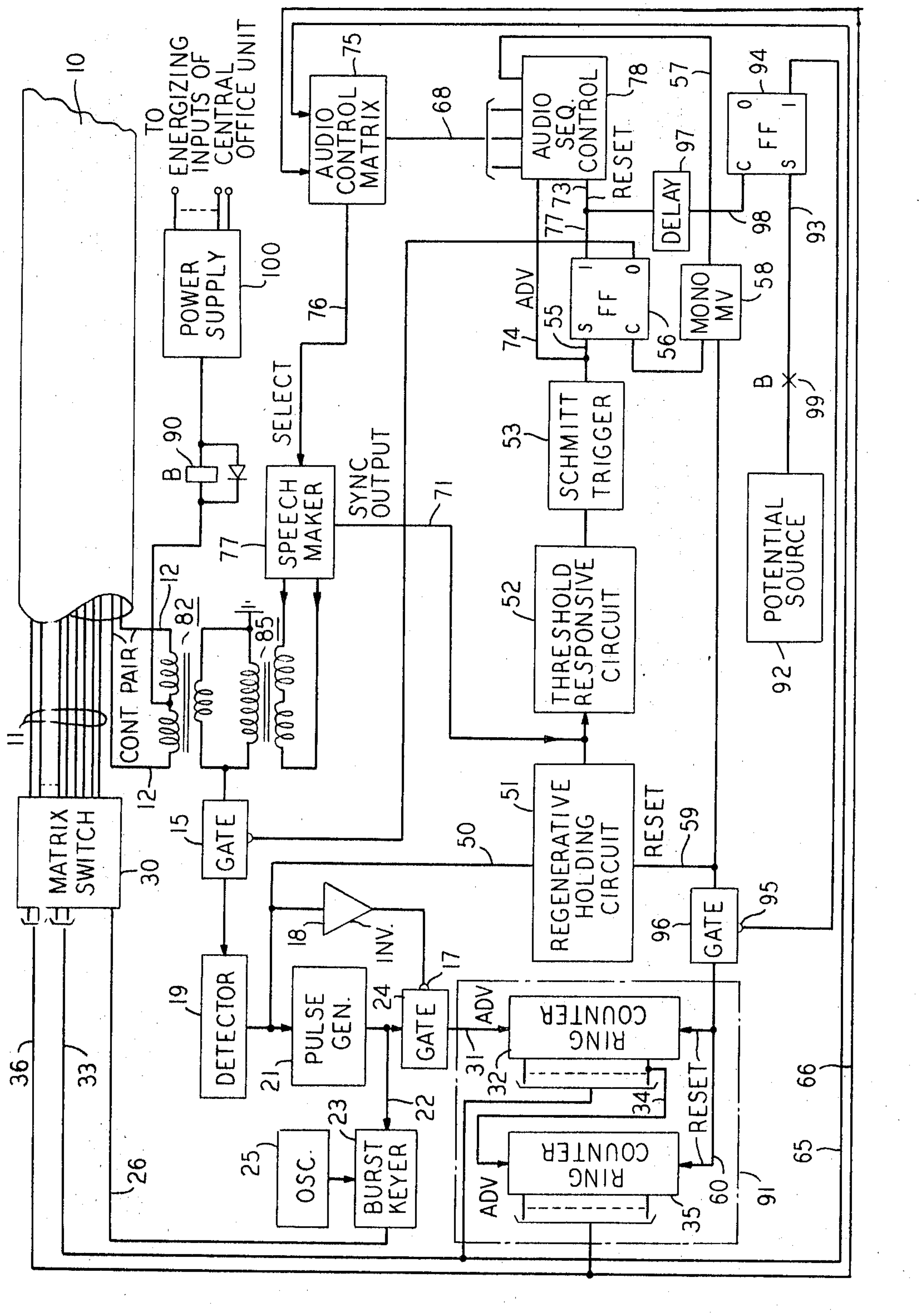
FIG. 1 is a block diagram of the central office unit of an automatic conductor pair identification apparatus in accordance with the invention.
Figure 2:
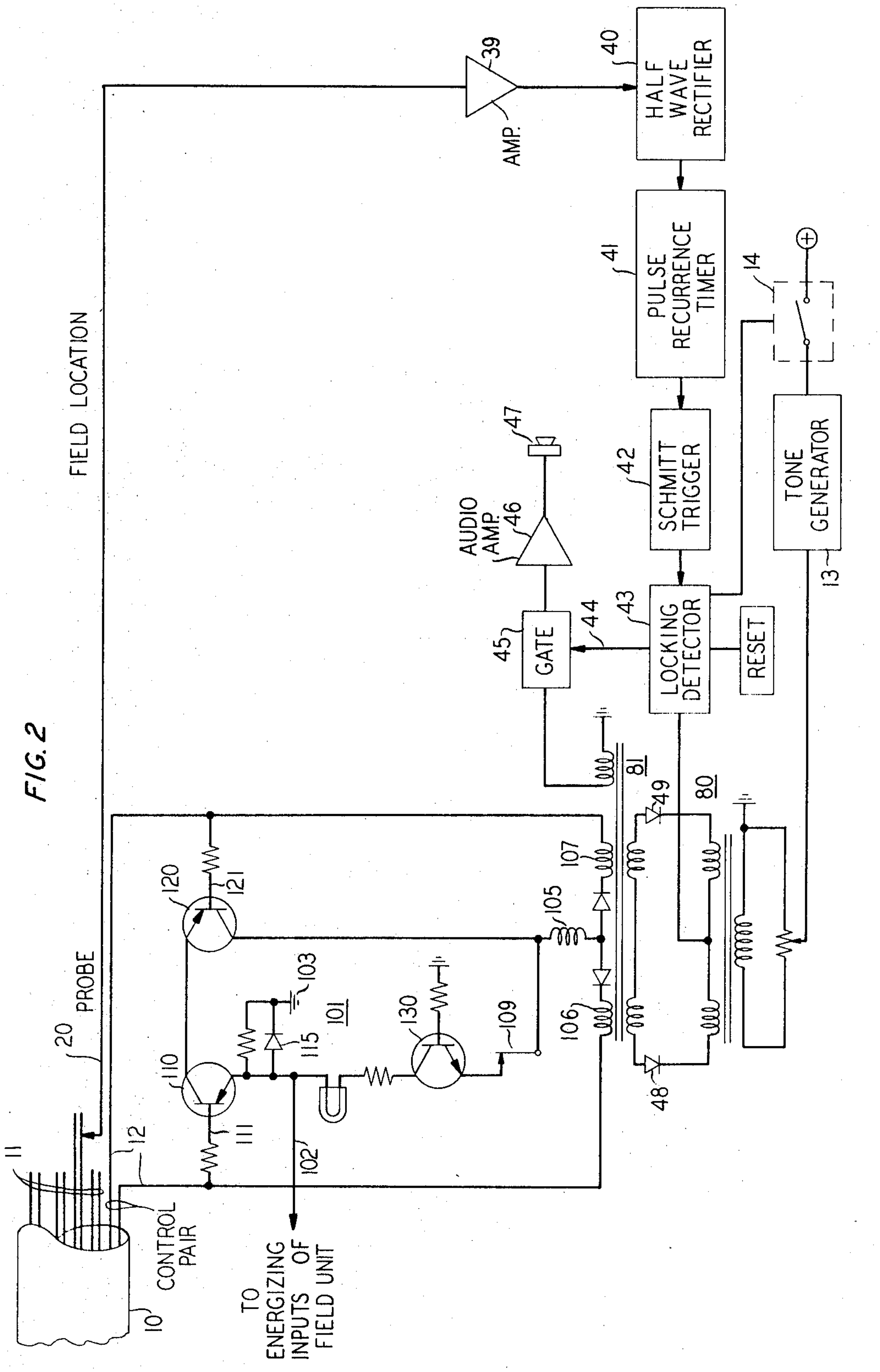
FIG. 2 is a block diagram of the field unit of an automatic conductor pair identification apparatus in accordance with the invention.

The automatic conductor pair identification apparatus disclosed in FIGS. 1 and 2 comprises a central office unit and a field unit. The central office unit has a counter arrangement which controls a gating arrangement to step high frequency signal bursts in sequence to each conductor pair in the conductor cable. The starting and stopping of the counter arrangement is controlled by the field unit by means of a control signal supplied therefrom. Removal of this control signal in response to the detection by probing apparatus of the high frequency signal burst on a conductor pair causes the counting apparatus to stop. The counting apparatus activates a voice readout apparatus to read out the identification number of the conductor pair on which the high frequency signal burst was detected. This audio identification is transmitted to an audio readout device at the field location. When the identification procedure is complete, the counter apparatus at the central office returns to its initial start position in readiness to make another conductor pair identification.

Prior to the identification of one of the conductor pairs 11 in a multiconductor cable 10, the counter apparatus 91, comprising two ring counters, is preset at zero. The counter apparatus 91 is coupled to a matrix switch 30. The matrix switch 30 in response to the output of the counter apparatus 91 applies high frequency signal bursts in sequence to the individual conductor pairs 11. The multiconductor cable 10 interconnects the central office to some remote field location. The multiconductor cable 10, in addition to containing the unidentified conductor pairs 11, includes an easily identifiable spare conductor pair 12. The spare conductor pair 12 is used as a control wire and information carrying the connection from the identifier apparatus at the field location to the identifier apparatus at the central office. For illustrative purposes it is assumed that the multiconductor cable 10 contains 100 conductor pairs 11 plus the additional spare conductor pair 12. It is to be understood that the invention works equally well should the cable contain a different number of conductor pairs.

The operation of the apparatus is initiated by a single operator at the field location who attaches a probe 20, shown in FIG. 2, to an unidentified conductor pair 11 selected at random whose numerical identification it is desired to obtain. The operator activates the tone generator 13 by closing the switch 14. The activated tone generator 13 applies a 2-kilocycle tone signal to the spare conductor pair 12, via the coupling transformers 80 and 81. This tone signal is transmitted on the spare conductor pair 12 to the central office location shown in FIG. 1 where it is coupled, via the coupling transformer 82 to the gate 15. The gate 15 transmits this tone signal to the detector circuit 19. The detector circuit 19 is a multistate circuit which responds to the application and removal of the applied 2-kilocycle tone signal. The detector circuit 19 in response to the applied 2-kilocycle tone signal generates an energizing signal which is applied to the pulse generator 21. The pulse generator 21 in response thereto generates a periodic pulse output. The repetition rate of the pulse output is, for illustrative purposes, assumed to be 100 cycles. The pulse generator 21 may comprise a relaxation oscillator or some other suitable circuit known in the art.

The pulse output of the pulse generator 21 is applied, via lead 22, to a burst keyer 23. The burst keyer 23 in response to each pulse enables a short burst of the 6-kilocycle signal generated by the oscillator 25 to be transmitted to the output lead 26. The 6-kilocycle signal bursts are transmitted on lead 26 to the matrix switch 30. The burst keyer 23 may comprise an amplitude modulator circuit which modulates the carrier generated by the oscillator 25 in accordance with the generated pulse output of the pulse generator 21. Such circuits are well known in the art.

The output of the pulse generator 21 is also applied, via the gate 24 to the driving input lead 31 of a units ring counter 32 included in the counter apparatus 91. The units ring counter 32 has ten individual stages, one stage of which is always in an energized state. The energized state advances from one stage to a succeeding one of the ten stages in response to each pulse applied to it, via the driving input lead 31. The output of each energized stage of the units ring counter 32 is applied, via the leads 33, to the matrix switch 30. The energized output of the last stage of the units ring counter 32 is also applied, via lead 34, to the driving input of a tens ring counter 35, which is identical to the units ring counter 32. The tens ring counter 35, in response thereto, steps an energized state, which exists in one of its ten stages, to a succeeding stage. The stepped output of the tens ring counter 35 is applied, via the leads 36, to the matrix switch 30. The ring counters 32 and 35 may comprise any counter circuit having ten stages each capable of generating an independent output signal.

The matrix switch 30 is a commutating circuit which, in response to the output of the tens and the units ring counters 35 and 32, controls the sequential application of the 6-kilocycle signal bursts, applied to it via lead 26, to the conductor pairs 11. Each unique combination of the combined outputs of the units and tens ring counters enables the matrix switch 30 to apply a 6-kilocycle signal burst to a selected one of the conductor pairs 11. Commutating devices such as the matrix switch 30 are well known in the art, and it is not believed necessary to discuss such a circuit in detail.

The 6-kilocycle signal bursts, as hereinabove described, are sequentially stepped to each individual one of the conductor pairs 11 and transmitted thereon to the field location. The probe 20 shown in FIG. 2 is connected to a conductor pair 11, selected at random at the field location. When and if detected, the 6-kilocycle signal burst on the detected pair is applied to an amplifier 39. The amplifier 39 is coupled to a half-wave rectifier 40 which converts the received signal burst into a pulse signal of one polarity. The pulse signal output of the rectifier 40 is applied to a pulse recurrence timer 41 which accepts and transmits pulse signals of only a specified repetition rate. The timer 41 is designed to respond to the pulse signals derived from 6-kilocycle frequency signal bursts.

The pulse output of the timer 41 is applied to a Schmitt trigger 42 which responds only to pulse signals having some minimum predetermined amplitude threshold. The output pulse signal of the Schmitt trigger 42 is applied to the locking detector 43. The locking detector 43 in response to the Schmitt trigger 42 closes the gate 45 which couples the spare conductor pair 12 to the audio amplifier 46 and loudspeaker 47. The output of the locking detector 43 is utilized to open switch 14 and is additionally utilized to back bias the diodes 48 and 49 thereby positively blocking the 2-kilocycle tone signal from the spare conductor pair 12.

Upon the removal of the 2-kilocycle tone signal from the spare conductor pair 12, the detector circuit 19, shown in FIG. 1, changes state, and the signal energizing the pulse generator 21 is terminated. The signal output of the detector 19 is inverted by an inverter circuit 18 and the inverted signal is applied to the inhibit input 17 of the gate 24. The inhibited gate 24 prevents the application of driving pulses from the pulse generator 21 to the driving input lead 31 of the ring counter 32. Accordingly, the counting of the two ring counters 32 and 35 is halted. The energized signals existing at the stages, at which the individual ring counters 32 and 35 halt, are applied, respectively, via the leads 65 and 66 to the audio control matrix 75.

The audio control matrix 75 is coupled by lead 76 to the speech maker 77 and controls the selection of two or more digits as may be the case from the voice recorded storage medium of the speech maker 77. The audio control matrix 75 is of the same design as the matrix switch 30. The order in which the digits are selected is controlled by the audio sequence control 78 which is coupled to the audio control matrix 75. The audio sequence control 78 may comprise a ring counter or other suitable signal stepping circuit.

The speech maker 77 may include a magnetic drum type storage medium with a sufficient number of parallel circumferential tracks to store the required number of audio digits and an additional circumferential track to store a synchronizing signal. The synchronizing signal is utilized, as described below, to control the sequential stepping of the audio sequence control 78. The magnetic drum rotates continuously. Gating circuits for each circumferential track are controlled by the audio control matrix 75 to read out the appropriate audio digits. A speech maker suitable for use in the present invention is disclosed in patent 3,288,944 by N. P. Fleming, issued Nov. 29, 1966 and assigned to the assignee of the present application. The readout audio digits are applied to the spare conductor pair 12, via the coupling transformers 85 and 82, whereby it is transmitted to the readout apparatus at the field location.

The audio readout of the speech maker 77 is inhibited until the detector 19 changes state in response to the removal of the applied tone signal supplied from the field location. This change in state, transmitted via lead 50, activates the regenerative holding circuit 51. The regenerative holding circuit 51 may comprise a silicon controlled switch. This holding circuit 51 after turn-on remains in a conducting condition until the driving current ceases or the circuit is reset. The holding circuit 51 applies a signal level to the threshold circuit 52 sufficient in amplitude to permit the cumulative amplitude of the synchronizing pulses supplied by the speech maker 77, via lead 71, and the output of the holding circuit 51 to activate the threshold circuit 52. Hence, with the holding circuit 51 activated, the synchronizing pulse output of the speech maker 77 activates the threshold circuit 52. The threshold circuit 52 in turn activates the Schmitt trigger 53. The pulse output of the activated Schmitt trigger 53 is applied to the advance input 74 of the audio sequence control 78 and to the set input 55 of the bistable multivibrator 56. The multivibrator 56 in its set condition permits the signal stepping action of the automatic sequence control 78 to occur by removing the signal from its reset input 73.

The audio sequence control 78 steps a signal along its output leads 68, which is applied to the audio control matrix 75 to control the gating of audio digits supplied by the speech maker 77.

The output of the final stage of the audio sequence control 75 is applied, via lead 57, to a monostable multivibrator 58. The multivibrator 58 in response thereto is triggered into its quasi stable state. The quasi stable output of the monostable multivibrator 58 is applied, via leads 59 and 60, to the reset inputs of the holding circuit 51 and the ring counters 32 and 35, respectively.

The audio output of the speech maker 77 is transmitted to the spare conductor pair 12, as described above, and transmitted thereon to the field location. As described above, the locking detector 43, shown in FIG. 2, in response to the high frequency signal bursts detected by the probe 20 is activated. The output of the locking detector 43 on lead 44 enables the transmission of the audio identification from the coupling transformer 81 through the gate 45 to the audio amplifier 46 and the loudspeaker 47.

In the case of a crossed conductor pair condition the loudspeaker will read out an identification number that represents the lower identification number of the two crossed pairs. An identification number readout that is the same as a previous identification number readout indicates to the operator that he has detected a crossed conductor pair. Because the central office apparatus stops stepping the high frequency signal bursts to the conductor pairs 11 when the probe 20 detects the bursts on a conductor pair, the audio readout of the conductor pair numerical identity is always the lower identification number identifying one of the two crossed conductor pairs.

To determine the higher identification number the operator momentarily opens the switch 109 shown in FIG. 2 which is connected in a simplex connection to the relay coil 90 at the central office shown in FIG. 1. The simplex connection is utilized to transmit power from the power supply 100 at the central office shown in FIG. 1, via the spare control pair 12, to the field apparatus shown in FIG. 2. The operation of simplex connections is well known in the art, thus it is not believed necessary to discuss its operation in detail.

This break in the continuity of the simplex circuit occasioned by the opening of switch 109 deactivates the relay coil 90 thereby releasing the relay contact 99. The relay contact 99 interconnects the potential source 92 to the set input lead 93 of the bistable multivibrator 94. The signal transition due to disconnecting the source 92 switches the multivibrator 94 into its set state thereby applying inhibit signals to the inhibit input 95 of the gate 96, and hence prevents the application of reset signals by the multivibrator 58 to the holding circuit 51 and the ring counters 32 and 35.

The operator then initiates an identification operation by closing the switch 14 at the field location shown in FIG. 2. The central office identification apparatus in response thereto operates as described above. The ring counters 32 and 35 and the holding circuit 51 are not reset following the identification numerical readout since the gate 96 is inihibited preventing the transmission of the reset signal supplied by the monostable multivibrator 58 to the reset input leads 60 and 59. To maintain the gate 96 in its inhibited state for a sufficient duration to prevent the resetting of the counters 32 and 35 and the holding circuit 51 a delay circuit 97 is included in the clear input lead 98 of the multivibrator 94 to prevent its clearing until the quasi stable reset output of the monostable multivibrator 58 has switched off.

The operator at the field location now again closes the switch 14 and the counters 32 and 35 begin counting from the point at which they halted at the previous numerical readout. Since the counters 32 and 35 start counting from this previous readout number they can count to the higher numbered identification number of the crossed conductor pairs. Since the resetting of the counters 32 and 35 is not inhibited after the higher count crossed pair identification operation, the following subsequent identification operation will proceed in the normal fashion.

The power to operate the identification apparatus is supplied by the power supply 100 at the central office location shown in FIG. 1. The power supply 100 energizes both the central office unit and the field unit. Power is transmitted to the field unit, via the spare conductor pair 12, using simplex transmission techniques. If one of the conductors of the spare conductor pair 12 is open circuited the field unit will apparently function normally, but the applied tone signal to the central office unit will not be sufficient in amplitude to properly operate the detector 19. Hence many false readouts or other system malfunctions unapparent to the operator in the field may occur. To avoid this condition, an open circuit detector 101 shown in FIG. 2 is included in the apparatus at the field location to indicate an open circuit condition in one of the conductors of the spare conductor pair 12.

The open circuit detector 101 is shunted across the two conductors of the spare conductor pair 12. The transistors 110 and 120 have their base electrodes 111 and 121, respectively, connected to opposite conductors of the spare conductor pair 12. When both conductors of the spare conductor pair 12 are continuous a current is drawn through the inductor 105, and the collector emitter paths of the transistors 110 and 120 to the ground 103. The local circuits in the field units are energized by power supplied to the field apparatus, via lead 102. Voltage regulation of this power is provided by the Zener diode 115.

Should one conductor of the spare conductor pair 12 be discontinuous, the unbalance will disable one of the transistors 110 or 120 and cause an unbalanced current to flow in one of the inductors 106 or 107. This will draw a current through the transistor 130 causing the indicator lamp 108 to light up indicating a discontinuous conductor in the spare conductor pair 12. Additionally, the current drawn through the transistor 130 will be insufficient to energize the field apparatus thereby disabling the automatic identifier.

It is to be understood that while certain signal frequencies and signal durations have been specified for illustrative purposes, many other frequencies and durations may be readily substituted by those skilled in the art.

While the conductor pair identification system of the present invention has been described in connection with identifying conductors in a telephone cable, it is to be understood that this embodiment is simply illustrative of the many possible arrangements which can represent applications of the principles of the invention. The other applications can readily be devised by those skilled in the art without departing from the spirit or scope of this invention.

What is claimed is:

1. Conductor pair identification apparatus to identify individual conductor pairs in a multiconductor cable interconnecting a near end and a far end comprising a first signal source, a pulse generator activated by said first signal source, a second signal source of bursts of signals responsive to said pulse generator, cyclic counting means responsive to said pulse generator, means responsive to the advance of said counting means to sequentially advance said bursts of signals to each of said conductor pairs at said near end, probe means at said far end to detect said bursts of signals on a selected conductor pair, means to disable said first signal source to halt said counting means and said bursts of signals, said means to disable connected to and responsive to signals detected by said probe, means to read out the count at which said counting means halts counting, said means to read out responsive to the disabling of said first signal source, recyling means responding to said means to read out to apply a reset signal to said counter, and crossed pair identification means to inhibit the resetting of said counter by said recycling means responsive to signals sent from said far end upon the detection of a crossed pair including means to inhibit the application of said reset signal to said counter and means to enable said first signal source and initiate subsequent counting action in the counter at the particular count at which the resetting action was inhibited.

2. Conductor pair identification apparatus as defined in claim 1 further including an energizing source at the near end, a spare conductor pair interconnecting the near end and the far end, and said spare conductor pair being connected to said energizing source in a simplex connection to transmit the power output of said energizing source to the far end.

3. Conductor pair identification apparatus as defined in claim 2 wherein said crossed pair identification means to inhibit the resetting of said counter comprises current responsive switching means included in the simplex connection of said spare conductor pair, means to interrupt the continuity of said simplex connection, said current responsive switching means changing state in response to the interruption of the continuity of said simplex connection and gating means responsive to said changing state to block the application of reset signals generated by said recycling means to said counting means.

4. Conductor pair identification apparatus as defined in claim 3 wherein said means to read out the count at which said counter has halted comprises a storage medium at the near end containing stored audio digits, gating means responsive to said counting means to read out selected audio digits in accordance with the count at which said counter is halted, and means to utilize said spare conductor pair to transmit said selected audio digits to the far end.

5. Conductor pair identification apparatus as defined in claim 4 further including means to detect open circuit conditions in said spare conductor pair comprising signal gating means responsive to the continuity of each conductor of said spare conductor pair and indicating means responsive to said gating means to indicate a discontinuous conductor.

6. An automatic conductor pair identifying apparatus to identify conductor pairs in a multiconductor cable connecting a central office to a field location comprising a counter at the central office, a tone source at the field location, means to connect said tone source to said counter, said counter counting in response to said tone, a source of signal bursts, matrix switching means connected to said source of signal bursts and stepping said signal bursts to each conductor pair in sequence in response to the output of said counter, a probe at said field location to detect said signal bursts on a selected one of said multiconductor pairs, means to disable said tone source to halt said counter when said signal burst is detected by said probe, means to transmit the count of said halted counter to the field location, means to recycle said counter at the end of the transmission of the count including means responsive to said means to transmit to apply a reset signal to said counter and means to inhibit said means to recycle by disabling the application of reset signals to said counter, means at the central office to energize the apparatus at the field location, said means to energize including control means to activate said means to inhibit said means to recycle, said means to activate including gating means to disable the application of reset signals to said counter, and means to resume counting in said counter at the count at which it is halted including means to couple said tone source to said counter.

7. An automatic conductor pair identifying apparatus as defined in claim 6 wherein said means to inhibit said means to recycle includes gating means to prevent the application of reset signals to said counter in response to said switching means and said means to transmit the count includes a source of audio digits and means to select audio digits identifying the conductor pair to which said probe is connected.

References Cited

UNITED STATES PATENTS

| | | | |
|---|---|---|---|
| 3,252,088 | 5/1966 | Palmer | 324—66 |
| 3,288,943 | 11/1966 | Bohnenblust | 324—66X |
| 3,288,945 | 11/1966 | McNair et al. | 324—66X |
| 3,427,538 | 2/1969 | Bohnenblust | 324—66 |

GERARD R. STRECKER, Primary Examiner

U.S. Cl. X.R.

179—175.3